United States Patent
Natzke et al.

(10) Patent No.: US 9,740,310 B2
(45) Date of Patent: Aug. 22, 2017

(54) INTUITIVE CONTROL OF PRESSURE-SENSITIVE STROKE ATTRIBUTES

(71) Applicant: ADOBE SYSTEMS INCORPORATED, San Jose, CA (US)

(72) Inventors: Erik Natzke, San Francisco, CA (US); Christopher Nuuja, San Anselmo, CA (US); Sebastian Marketsmueller, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 92 days.

(21) Appl. No.: 14/719,628

(22) Filed: May 22, 2015

(65) Prior Publication Data

US 2016/0342227 A1 Nov. 24, 2016

(51) Int. Cl.
| | |
|---|---|
| *G06T 11/20* | (2006.01) |
| *G06F 3/0488* | (2013.01) |
| *G06F 3/0354* | (2013.01) |
| *G06F 3/041* | (2006.01) |
| *G06T 11/00* | (2006.01) |

(52) U.S. Cl.
CPC ........ *G06F 3/03545* (2013.01); *G06F 3/0412* (2013.01); *G06F 3/0414* (2013.01); *G06F 3/04883* (2013.01); *G06T 11/001* (2013.01); *G06T 11/203* (2013.01)

(58) Field of Classification Search
CPC .. G06F 3/03545; G06F 3/0412; G06F 3/0414; G06F 3/04883; G06T 11/001; G06T 11/203
See application file for complete search history.

(56) References Cited

U.S. PATENT DOCUMENTS

| | | | | |
|---|---|---|---|---|
| 4,514,818 | A * | 4/1985 | Walker | G06T 11/001 345/156 |
| 5,155,813 | A * | 10/1992 | Donoghue | G06F 3/04845 345/179 |
| 5,598,182 | A * | 1/1997 | Berend | G06T 11/001 345/441 |
| 5,611,036 | A * | 3/1997 | Berend | G06T 11/001 345/441 |

(Continued)

*Primary Examiner* — Michael J Eurice
(74) *Attorney, Agent, or Firm* — Shook, Hardy & Bacon, L.L.P.

(57) ABSTRACT

Embodiments of the present invention provide systems, methods, and computer storage media directed to a drawing application that enables intuitive application of a pressure-sensitive effect to a rendered stroke. Such a drawing application may receive input stroke data along including pressure measurements along a path of the stroke. The drawing application may then map the pressure measurements to respective attribute values for a pressure sensitive stroke attribute. Such a mapping results in a pressure measurement at a predefined level of pressure mapping to a default attribute value, while a pressure measurement above or below the predefined level of pressure would result in an attribute value greater than or less than the default attribute value. The drawing application may then cause a stroke to be rendered on the display in accordance with the attribute values for the pressure sensitive stroke attribute.

20 Claims, 7 Drawing Sheets

(56) References Cited

U.S. PATENT DOCUMENTS

| | | | | | |
|---|---|---|---|---|---|
| 5,635,683 | A * | 6/1997 | McDermott | G06F 3/0414 | 178/19.04 |
| 5,767,860 | A * | 6/1998 | Zimmer | G06T 11/001 | 345/441 |
| 5,870,097 | A * | 2/1999 | Snyder | G06T 11/001 | 345/422 |
| 6,038,031 | A * | 3/2000 | Murphy | G06T 5/20 | 345/582 |
| 6,067,073 | A * | 5/2000 | Rae-Smith | G06T 11/001 | 345/589 |
| 6,133,901 | A * | 10/2000 | Law | G09G 5/20 | 345/611 |
| 2002/0021301 | A1* | 2/2002 | Suzuki | G06F 3/04845 | 345/581 |
| 2003/0025713 | A1* | 2/2003 | Wang | G06T 11/203 | 345/611 |
| 2004/0190085 | A1* | 9/2004 | Silverbrook | G06F 3/03545 | 358/474 |
| 2004/0190092 | A1* | 9/2004 | Silverbrook | G06F 3/03545 | 358/539 |
| 2004/0213482 | A1* | 10/2004 | Silverbrook | B41J 2/14 | 382/312 |
| 2004/0246240 | A1* | 12/2004 | Kolmykov-Zotov | G06F 3/04883 | 345/179 |
| 2005/0156915 | A1* | 7/2005 | Fisher | G06F 3/0317 | 345/179 |
| 2006/0274057 | A1* | 12/2006 | Van Ness | G06F 3/04883 | 345/179 |
| 2007/0129840 | A1* | 6/2007 | Nobuyuki | D05B 19/10 | 700/138 |
| 2007/0216684 | A1* | 9/2007 | Hsu | G06T 11/60 | 345/441 |
| 2007/0268304 | A1* | 11/2007 | Hsu | G06T 11/001 | 345/592 |
| 2008/0180410 | A1* | 7/2008 | McCall | G06T 11/203 | 345/179 |
| 2008/0273057 | A1* | 11/2008 | Lapstun | B41J 2/17503 | 347/44 |
| 2009/0135149 | A1* | 5/2009 | Taniuchi | G06F 3/04845 | 345/173 |
| 2011/0205178 | A1* | 8/2011 | Yoshida | G06F 1/1616 | 345/173 |
| 2011/0304643 | A1* | 12/2011 | Marison | G06F 3/04883 | 345/611 |
| 2012/0105367 | A1* | 5/2012 | Son | G06F 3/0414 | 345/174 |
| 2013/0009884 | A1* | 1/2013 | Wang | G06F 3/03545 | 345/173 |
| 2013/0120426 | A1* | 5/2013 | DiVerdi | G06T 11/001 | 345/589 |
| 2013/0226504 | A1* | 8/2013 | George | G06F 3/0414 | 702/138 |
| 2013/0229360 | A1* | 9/2013 | Liang | G06F 3/04883 | 345/173 |
| 2014/0198080 | A1* | 7/2014 | Mankowski | G06F 3/03545 | 345/179 |
| 2014/0210798 | A1* | 7/2014 | Wilson | G06F 3/0414 | 345/179 |
| 2015/0067560 | A1* | 3/2015 | Cieplinski | G06F 3/04842 | 715/765 |
| 2015/0091859 | A1* | 4/2015 | Rosenberg | G06F 3/044 | 345/174 |
| 2015/0205351 | A1* | 7/2015 | Osterhout | G06F 3/012 | 345/156 |
| 2015/0249696 | A1* | 9/2015 | Nagase | H04L 65/403 | 709/203 |
| 2015/0277653 | A1* | 10/2015 | Xiong | G06F 3/0414 | 345/173 |
| 2015/0371417 | A1* | 12/2015 | Angelov | G06Q 10/101 | 345/442 |
| 2016/0026239 | A1* | 1/2016 | Border | G02B 27/017 | 345/8 |
| 2016/0048318 | A1* | 2/2016 | Markiewicz | G06F 3/04883 | 345/173 |
| 2016/0078291 | A1* | 3/2016 | Kim | G06F 3/04883 | 382/164 |
| 2016/0109709 | A1* | 4/2016 | Osterhout | G06F 3/03545 | 359/614 |
| 2016/0116745 | A1* | 4/2016 | Osterhout | G06F 3/03547 | 359/614 |
| 2016/0179365 | A1* | 6/2016 | Angelov | G06K 9/00402 | 345/179 |
| 2016/0188181 | A1* | 6/2016 | Smith | G06F 3/048 | 715/765 |
| 2016/0259471 | A1* | 9/2016 | Ledet | G06F 3/0488 | |
| 2016/0283520 | A1* | 9/2016 | Yamaji | G06F 17/30256 | |
| 2016/0283777 | A1* | 9/2016 | Holden | G06K 9/00154 | |
| 2016/0292500 | A1* | 10/2016 | Angelov | G06K 9/00416 | |
| 2017/0025091 | A1* | 1/2017 | Haddick | G09G 5/02 | |

* cited by examiner

INTUITIVE CONTROL OF PRESSURE-SENSITIVE STROKE ATTRIBUTES

BACKGROUND

Touchscreen devices allow users to navigate their computer devices with a touch of a finger or stylus on the touchscreen. The device reads input made by the contact of the finger or stylus and the screen. These devices have evolved to read strokes made by the finger or stylus on the screen and render these strokes graphically on the screen. Drawing tablets are computer input devices that allow users to hand-draw images and graphics on the tablet similar to how one would draw with a pencil or brush on paper or canvas. Typically, a user draws with a stylus or finger on the drawing tablet. The tablet is like a digital canvas where the motion of the stylus is reproduced, or rendered, digitally on a computer display. In addition, some drawing applications incorporate pressure input from a stylus or touchscreen into the stroke by applying an effect to the stroke rendered on the display based upon the pressure. Artists commonly use touchscreen devices or drawing tablets in conjunction with a pressure sensitive drawing application for artistic renderings. As such, applying an effect and providing control over the effect in an intuitive manner from an artist's perspective is important.

Under the current state of the art, pressure sensitive drawing applications may enable a user to select a maximum effect and a minimum effect to be applied in response to maximum and minimum pressure, respectively. The user, however, has no control over the effect of anything between the maximum and minimum effect, other than the selection of the maximum and minimum effect. This is not intuitive from an artist's perspective.

The background description provided herein is for the purpose of generally presenting the context of the disclosure. Unless otherwise indicated herein, the materials described in this section are not prior art to the claims in this application and are not admitted to be prior art by inclusion in this section.

SUMMARY

Embodiments of the present invention are directed at enabling intuitive application of visual effects to a rendered stroke based on a pressure input in a drawing application. Intuitively, an artist wants to make an effect bigger or smaller in response to pressure. The artist would like normal, or median, pressure to not cause any changes.

In embodiments, a pressure-sensitive stroke attribute for a rendered stroke may be selected by a user of a drawing application. This pressure-sensitive stroke attribute may be, for example, width, opacity, or texture of the rendered stroke that the user would like to control through pressure input. The user may also select a default attribute value for the pressure-sensitive stroke attribute. This default attribute value may be applied to locations along a path of the rendered stroke in response to detecting a predefined level of pressure. The predefined level of pressure may be a midpoint, or median, of a range of possible pressure levels. Detection of a level of pressure above or below that predefined level of pressure would cause either an increase or decrease to the pressure sensitive stroke attribute. Thus, in embodiments, this invention implements a pressure-sensitive effect to the stroke where median pressure does not have an effect, but pressure above or below that median pressure does.

For example, the user may select width of a stroke as the pressure-sensitive stroke attribute. In addition, the user may select a default width for the stroke. As such, the user may be able to cause a stroke to be rendered at that default width by applying a median amount of pressure while more pressure may cause the width of the stroke to increase and less pressure may cause the width of the stroke to decrease. As such, the application of the pressure-sensitive effect to the stroke is more intuitive from the perspective of the artist.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Conventional pressure sensitive drawing applications enable a user to select a maximum effect (e.g., maximum thickness) and a minimum effect (e.g., minimum thickness) for a rendered stroke in response to application of maximum and minimum pressure, respectively. The user, however, has no control over the effect of anything between the maximum and minimum effect, other than the selection of the maximum and minimum effect. This is not intuitive from an artist's perspective. Rather, an artist may wish to use a median amount of pressure to maintain a default effect (e.g., default thickness of a rendered stroke) while pressure above or below the median amount of pressure results in the effect becoming bigger or smaller in response to pressure.

As such, embodiments of the present invention are directed at enabling intuitive application of effects to a rendered stroke based on a pressure input in a drawing application. In embodiments, a pressure-sensitive stroke attribute for a rendered stroke may be selected by a user of a drawing application. This pressure-sensitive stroke attribute may be, for example, width, opacity, or texture of the rendered stroke that the user would like to control through pressure input. The user may also select a default attribute value (e.g., default width) for the pressure-sensitive stroke attribute. In embodiments, this default attribute value may be applied to locations along a path of the rendered stroke in response to detecting a median, or midpoint, level of pressure. Detection of a level of pressure above or below the midpoint level of pressure would cause either an increase or decrease to the pressure sensitive stroke attribute of a rendered stroke. Thus, in embodiments, this invention implements a more intuitive pressure-sensitive effect to a rendered stroke.

Figure 1:
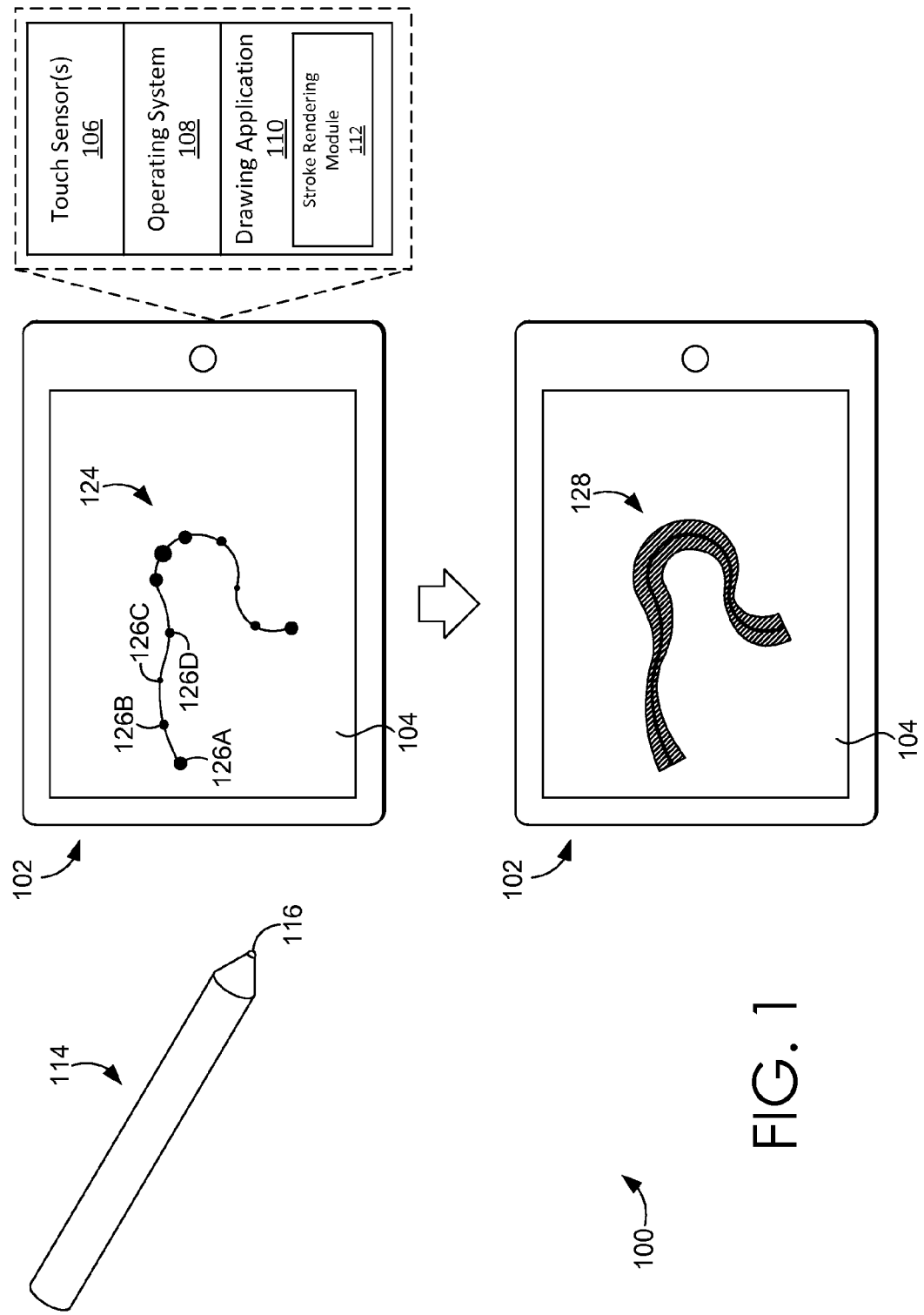
FIG. 1 depicts an illustrative computing environment in which embodiments of the present disclosure may be employed.

FIG. 1 depicts an illustrative computing environment 100 in accordance with various embodiments of the present invention. As depicted, computing environment 100 includes an example computing device 102 along with an example stylus 114, hereinafter respectively referred to merely as computing device 102 and stylus 114 for simplicity. It will be appreciated that computing device 102 and stylus 114 are merely meant to be illustrative of a possible computing device and possible stylus and that the composition of these items depicted in FIG. 1 and described below is selected for ease of explanation and should not be treated as limiting of this disclosure.

Computing device 102 includes display screen 104, touch sensor(s) 106, operating system 108, drawing application 110, and stroke rendering module 112. The operating system 108 can be any conventional operating system known in the art. Drawing application 110 can be any suitable drawing application that can take into account pressure input, such as, for example, ADOBE® Illustrator or ADOBE® Photoshop (both available from Adobe Systems Inc. of San Jose, Calif.).

Display screen 104 may be configured to visually present, display, or output information, such as, for example, drawings, sketches, images, text, figures, values, symbols, videos, video clips, movies, photographs, lists, data sets, webpages, emails, text messages, notifications, or any other content. As depicted, in some embodiments, display screen 104 is integrated with computing device 102. In other embodiments, the display screen may be coupled with a computing device by way of a wired or wireless connection. Such a wired or wireless connection could include, for example, a video graphics array (VGA) connection, a digital visual interface (DVI) connection, a high-definition multimedia interface (HDMI) connection, wireless display (WiDi) connection, a Miracast connection, a Digital Living Network Alliance (DLNA) connection, etc.

As mentioned above, computing device 102 includes touch sensor(s) 106. The touch sensor(s) 106 configure display screen 104 as a touch sensitive display. A touch sensitive display enables detection of location of touches or contact within a display area. In this regard, a touch sensitive display refers to a display screen to which a user can provide input or interact therewith by making physical contact or near contact with the display screen. An illustrative example includes a user utilizing stylus 114 to tap, move, or use some other form of touch action, to interact with a user device, such as computing device 102. Other items, such as the user's finger, fingernail, etc., may be used to provide input to the device by way of touchscreen display. As such, a touch sensitive display can be used as an input component irrespective of whether a keyboard or mouse is used as an input component for interacting with displayed content, such as, for example, an image or drawing. As depicted, the touch sensor(s) 106 would enable such input to computing device 102 through display screen 104. Such input could be utilized, for example, to navigate operating system 108 or an application executing on computing device 100, such as drawing application 110. As another example, such input could also be utilized to input stroke data to drawing application 110 and/or stroke rendering module 112. The input stroke data may be utilized by drawing application 110 or stroke rendering module 112 to integrate a rendered stroke with, for example, an image rendered on the display screen 104. For example, a user may indicate a path of an input stroke by moving or traversing stylus 114 across a portion of the image rendered on display screen 104.

The touch sensor(s) 106 may include any touch sensor capable of detecting contact, or touch, of an object with display screen 104 of computing device 102. As mentioned above, such an object could be, for example, stylus 114, a user digit (e.g., a finger), or another component that contacts display screen 104. The touch sensor(s) 106 may be any sensor technology suitable to detect an indication of touch. By way of example, and not limitation, the touch sensor(s) 106 might be resistive, surface-acoustic wave, capacitive, infrared, optical imaging, dispersive signal, acoustic pulse recognition, or any other suitable touch sensor technologies known in the art. Furthermore, as can be appreciated, any number of touch sensors may be utilized to detect contact with display screen 104.

In operation, a touch sensor detects contact of an object with at least a portion of display screen 104 of computing device 102. A touch sensor may generate a signal based on contact with at least a portion of display screen 104. In some embodiments, this signal may further be based on an amount of pressure applied to display screen 104. In one embodiment, the one or more touch sensor(s) 106 may be calibrated to generate a signal or communicate the signal upon exceeding a certain threshold. Such a threshold may be generally accepted as being representative of sufficient contact to reduce the risk of accidental engagement of the touch sensors. For example, in an instance when the touch sensor(s) 106 measures a certain threshold temperature or conductivity, the touch sensor(s) 106 may generate a signal and communicate the signal to, for example, the operating system 108 of the computing device. On the other hand, when the touch sensor(s) 106 do not measure the certain threshold temperature or conductivity, the touch sensor(s) 106 may not generate the signal or communicate the signal to the operating system 108. The touch sensor(s) 106 may be configured to generate signals based on direct human contact or contact by another object (e.g., stylus 114, etc.). As can be appreciated, the sensitivity of the touch sensor(s) 106 implemented into the computing device 102 can affect when contact with display screen 104 is registered or detected.

In one embodiment, the signal generated by the touch sensor(s) 106 may be communicated, directly or indirectly, to the operating system 108. As used in this context, the signal generated by the touch sensor(s) 106 may include raw signal data or a result of a calculation based upon raw signal data. The communication of the signal to the operating system 108 may be accomplished, for example through the use of a driver application. Such driver applications are known in the art and will not be discussed any further. In such an embodiment, the operating system 108 may also be configured to provide the signal to the drawing application 110 and/or stroke rendering module 112.

Although the computing device 102 of FIG. 1 is described as a having a touch sensitive display screen, as can be appreciated, computing devices without a touch sensitive display screen are contemplated as within the scope of embodiments described herein. In this regard, point(s) selected via a drawing tablet, mouse, or other selecting device can be detected and used in accordance herewith to initiate rendering, or drawing, of the stroke.

According to some embodiments, the stylus 114 comprises a pressure sensitive tip 116. The stylus 114 receives raw pressure data (e.g., in the form of a signal) from the pressure-sensitive tip 116 and sends the raw pressure data, or a modulated form of the raw pressure data, to computing device 102. This may be accomplished through any suitable wired or wireless data transmission means, such as, for example, bluetooth, universal serial bus (USB), etc. A modulated form of the raw pressure data may be, for example, modulating the raw pressure data to be within a range from 0 to 1, where 0 is no pressure and 1 is maximum pressure. The raw pressure data, or modulated form of the raw pressure data, may then be provided to drawing application 110, and ultimately stroke rendering module 112, by way of the operating system 108.

As depicted, in some embodiments drawing application 110 has stroke rendering module 112 integrated therewith. In such embodiments, stroke rendering module 112 could be loaded into drawing application 110, such as, for example, a plug-in of drawing application 110, or could be an integrated component of drawing application 110. In embodiments, where stroke rendering module is loaded into drawing application 110, the stroke rendering module could be, for example, a brush file. Such a brush file could be generated from any suitable application, such as ADOBE® Brush (also available from Adobe Systems Inc. of San Jose, Calif.). In other embodiments, the stroke rendering module 112 might be an independent application that causes an input stroke to be rendered on the display. In this regard, the stroke rendering module 112 might identify a manner in which to render one or more drawing strokes and, thereafter, communicate with an application (e.g., drawing application 110) that subsequently causes the input stroke to be rendered in accordance with the identified manner. Irrespective of whether the stroke rendering module 112 or another component causes the stroke to be rendered, a user of the computing device 102 can view the rendered stroke, via the display screen 104.

Stroke rendering module 112 may be configured to receive input stroke data. Input stroke data may include path data defining a path (e.g., path 124) of an input stroke to be rendered on display screen 104 of the computing device 102. This path data may be received directly or indirectly from touch sensor(s) 106 through user interaction with display screen 104, as discussed above. The path data may be in the form of, for example, coordinates defining path 124, or may be in any other form known in the art. In other embodiments, this path data may be received from a drawing tablet that may be configured with one or more touch sensors, similar to those described above, integrated therewith.

Input stroke data may also include a plurality of pressure measurements along the path of the stroke, represented here as pressure sampling points along the path (e.g., pressure points 126A-126D). As can be seen, the pressure sampling points vary in size along the path where the size of the pressure point correlates with an amount, or level, of pressure applied at that respective point along the path. For example, pressure point 126A is larger in size than pressure point 126B, thus indicating that a higher pressure level is applied at point 126A than is applied at point 126B. It will be appreciated by those of ordinary skill in the art that the sampling points depicted are merely meant to be illustrative and that more or fewer sampling points may be taken into account depending upon a sampling rate of the pressure measurements.

In some embodiments, these pressure measurements may be generated by pressure sensitive tip 116 of stylus 114, discussed above. In other embodiments, touch sensor(s) 106 may be configured to measure an amount of pressure applied to display screen 104 and, as a result, may be utilized to generate such pressure measurements. In still other embodiments, these pressure measurements may be received from a drawing tablet that may be configured with one or more touch sensors, similar to those described above, configured to measure an amount of pressure applied to the drawing tablet. It will be appreciated that other mechanisms known in the art for measuring pressure may be utilized without departing from the scope of this disclosure. Furthermore, the above described mechanisms for pressure measurement are merely selected as examples for illustrative purposes and therefore should not be thought of as limiting of this disclosure.

Stroke rendering module 112 is configured to map each of the pressure measurements (e.g., pressure points 126A-126D) along path 124 to respective attribute values for a pressure sensitive stroke attribute. Such a pressure sensitive stroke attribute may be any attribute affecting the appearance of a rendered stroke (e.g., rendered stroke 128). For example, the pressure sensitive stroke attribute may be thickness, opacity, texture, etc. of the rendered stroke. The attribute value assigned to the pressure sensitive stroke attribute at a certain point along the path of the stroke affects the appearance of the pressure sensitive stroke attribute in the rendered stroke at that certain point. For example, as can be seen, the pressure sensitive stroke attribute depicted by rendered stroke 128 is thickness of the rendered stroke. As the pressure level changes from one pressure measurement to another (e.g., from pressure point 126A to pressure point 126B), the thickness of rendered stroke 128 also changes.

As mentioned above, stroke rendering module 112 is configured to map each of the pressure measurements (e.g., pressure points 126A-126D) along path 124 to respective attribute values for a pressure sensitive stroke attribute. In embodiments, stroke rendering module 112 is configured to map a pressure measurement at a predefined level of pressure to a default attribute value, and may map pressure measurements at a level of pressure above or below the predefined level of pressure to larger or smaller attribute values than the default attribute value. In addition, the difference in magnitude between one attribute value and the default attribute value may correlate with a difference in magnitude between the pressure measurement associated with the one attribute value and the predefined level of pressure. This may be a one to one correlation or a scaled correlation depending upon the implementation and/or settings. For example, assume that the level of pressure applied at pressure point 126B is the default pressure level. As a result, the pressure sensitive stroke attribute of the rendered stroke at 126B would be determined by the default attribute value (e.g., default thickness). Application of a greater pressure level at pressure point 126A maps to a larger attribute value thereby making the rendered stroke thicker, while application of a lesser pressure level at pressure point 126C maps to a smaller attribute value (e.g., makes the line thinner). It will be appreciated that, while depicted here as progressively greater pressure levels mapping to progressively larger attribute values, stroke rendering module 112 may also be configured, in some embodiments, to operate in the opposite manner, such that progressively greater pressure levels map to progressively smaller attribute values and progressively lesser pressure levels map to progressively larger attribute values. Such an embodiment is discussed in greater detail below in reference to FIG. 3.

The above discussed default attribute value could, in some embodiments, be a user selected attribute value. For example, the user may desire a certain thickness for the rendered stroke when applying the default level of pressure and may select this thickness from a menu provided by either stroke rendering module 112 or drawing application 110. In such embodiments, the user may be presented with a user interface that enables the user to make such a selection. An example of such a user interface is discussed in reference to FIGS. 2-5. In other embodiments, the default attribute value may be programmatically selected. For example, if the user selects a brush that has a default opacity, then the attribute value for this default opacity would be the default attribute value. The above described default attribute value may also be referred to in the art as an authored value. For example, authored thickness would refer to the default thickness of a rendered stroke.

In some embodiments, stroke rendering module 112 is configured to determine a range of possible attribute values based on the default attribute value. For instance, a range of possible attribute values might include the default attribute value between a top and bottom of the range of possible attribute values, where the top and bottom of the range of possible attribute values reflect maximum and minimum attribute values that are each based on the default attribute value. As an example, assume the pressure sensitive stroke attribute is thickness, and the default attribute value is 6 points. Furthermore, assume that the top of the range is defined as 150% of the default attribute value and the bottom of the range is defined as 50% of the default attribute value, then the range of possible attribute values would be from 3 points up to 9 points.

The range of possible attribute values may be additionally based on user selectable values that enable the user to define the top and bottom of the range. In some embodiments, this may be accomplished through a single user selectable value. In such embodiments, the user could select a single value that defines both the top and the bottom of the range of possible attribute values. Such a user selectable value may be presented, via a user interface, to the user by the stroke rendering module 112, drawing application 110, or any other suitable application, such as the previously mentioned ADOBE® Brush. This single user selectable value along with an example user interface are depicted in FIGS. 2-5 and discussed in further detail in reference to these figures.

In some embodiments, the default level of pressure may also be user selected. For example, the user could select a default level of pressure that correlates with the amount of pressure the user typically exerts when drawing. Such a level of pressure may be referred to as an authored pressure level and may be selected at the stylus level, operating system level, within the stroke rendering module 112, or within drawing application 110. In other embodiments, the authored pressure level may be determined programmatically by, for example, stylus 114 or operating system 108. For example, the default level of pressure may be the average pressure when a user first touches down with the stylus, or other pressure sensing mechanism. In embodiments, the default level of pressure may be a midpoint of a range of possible pressure levels. For example, if the possible pressure level ranges from 0 to 1, with 0 being the lowest pressure level and 1 being the highest pressure level, then, in such embodiments, the default level of pressure would be the midpoint of this range, or a pressure level of 0.5.

Figure 2:
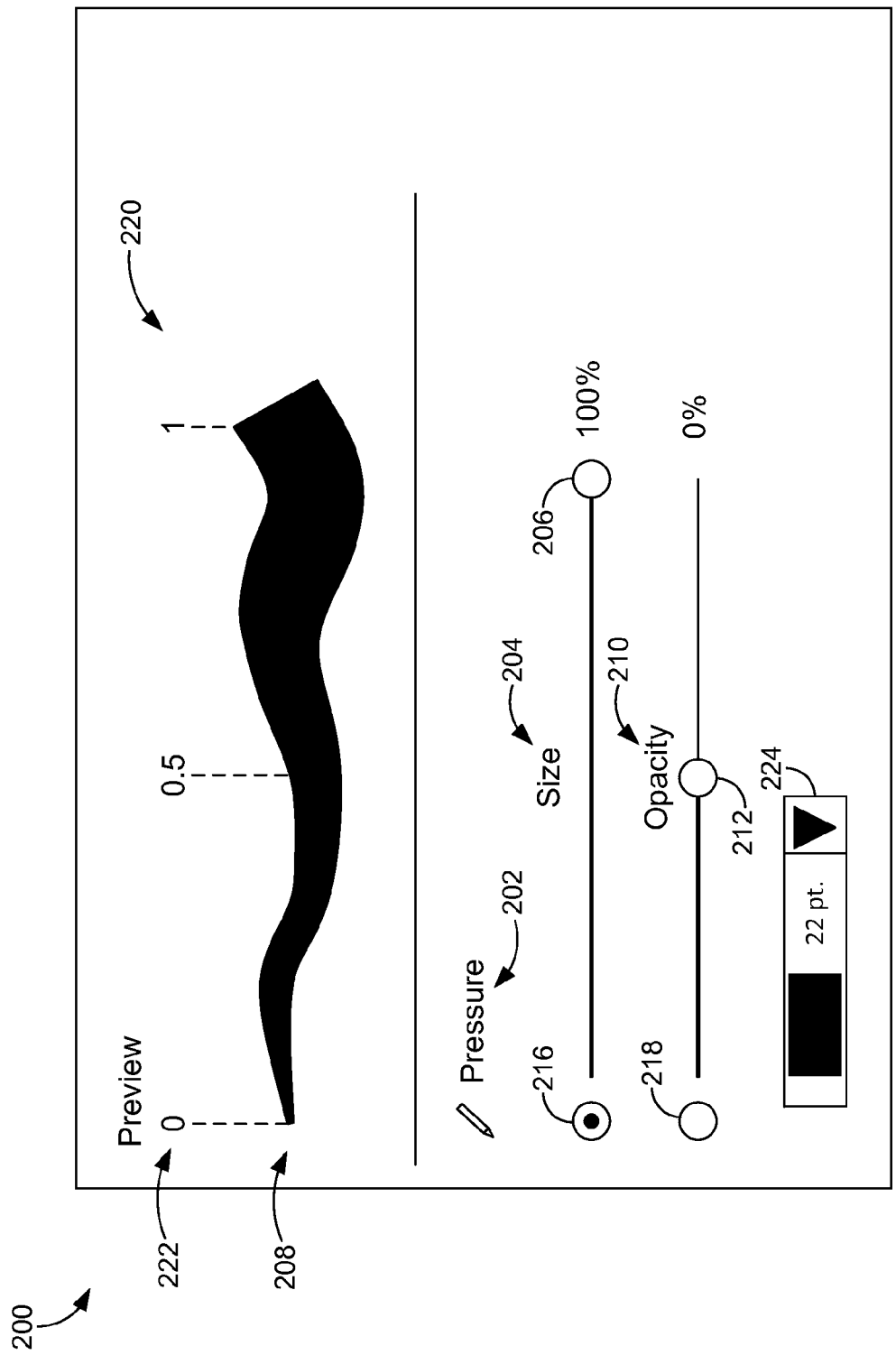
FIGS. 2-4 depict illustrative user interfaces for controlling effect of pressure on the thickness of a rendered stroke.

The above discussed mapping, may be accomplished, for example, by configuring stroke rendering module to implement the function:

$f(\text{attrib[positive]}, \text{pressure}[0 \ldots 1], \text{pressuretoattrib}[-1 \ldots 1])\{\text{pressuretoattrib} >= 0 : \text{lerp}(\text{attrib}, \text{attrib}*2*\text{pressure}, \text{pressuretoattrib}) \text{pressuretoattrib} < 0 : \text{lerp}(\text{attrib}, \text{attrib}*2*(1-\text{pressure}), -\text{pressuretoattrib})\}$ where $\text{lerp}(a,b,x) = a*(1-x) + b*x$ In the above function, attrib[positive] corresponds with the previously discussed default attribute value, which in this is example is limited to a positive value. Pressure[0 . . . 1] is the pressure level of the pressure measurement, which in this example is restricted, or clamped, to a range from 0 to 1. Pressuretoattrib[-1 . . . 1] is the user selectable value that enables the user to define the top and bottom of the range of possible attribute values, which in this example is a value between -1 and 1. As can be seen from the function, where the pressuretoattrib value is greater than 0, the attribute values would increase as pressure increases, as depicted in FIGS. 2 and 5. Where the pressuretoattrib value is less than 0, the attribute values would decrease as pressure increases, as depicted in FIG. 4. Where the pressuretoattrib value is 0, the attribute values would equal the default attribute value for all levels of pressure within the range of possible pressure levels, as depicted in FIG. 3.

Figure 3:
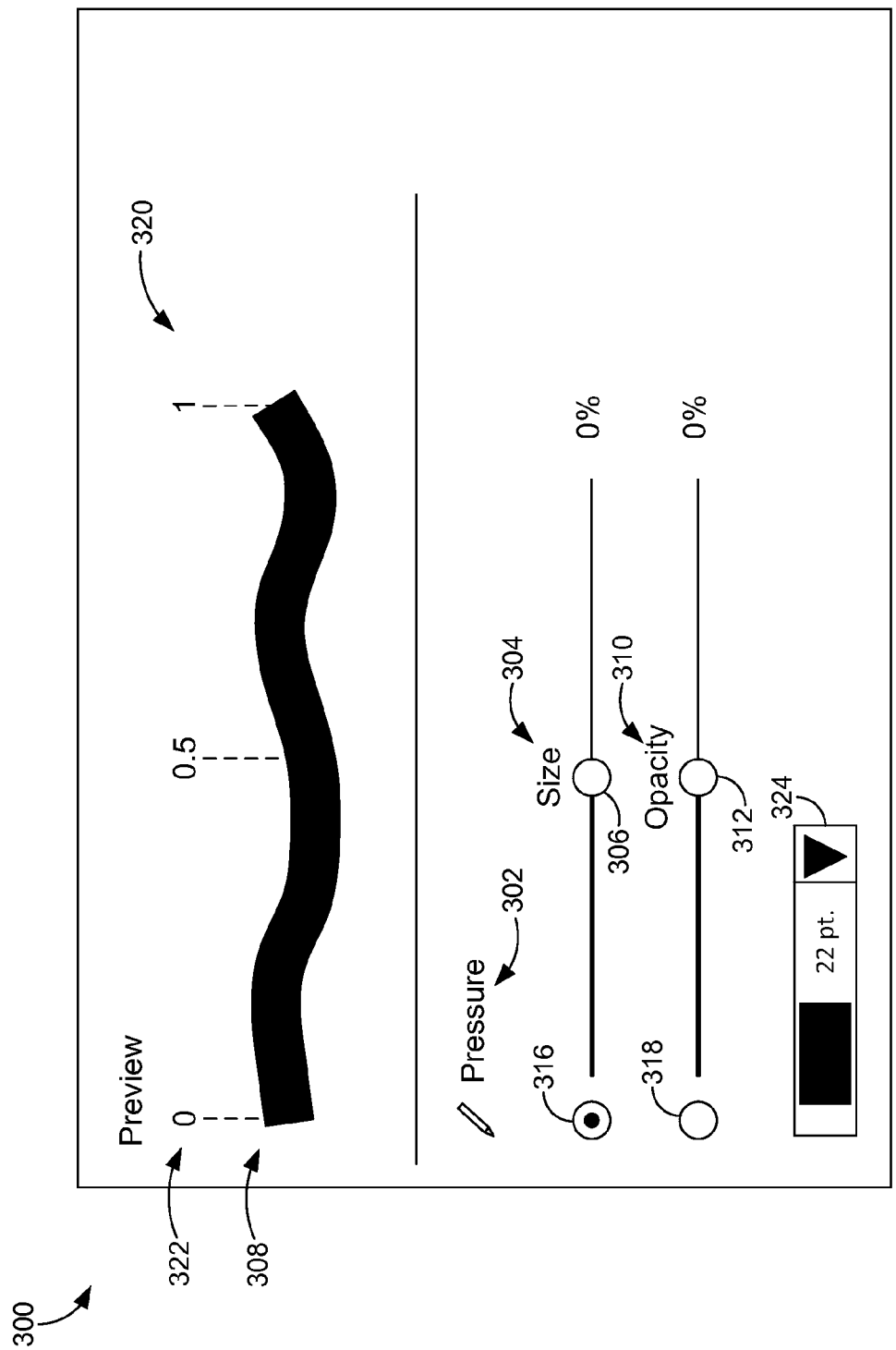
Figure 4:
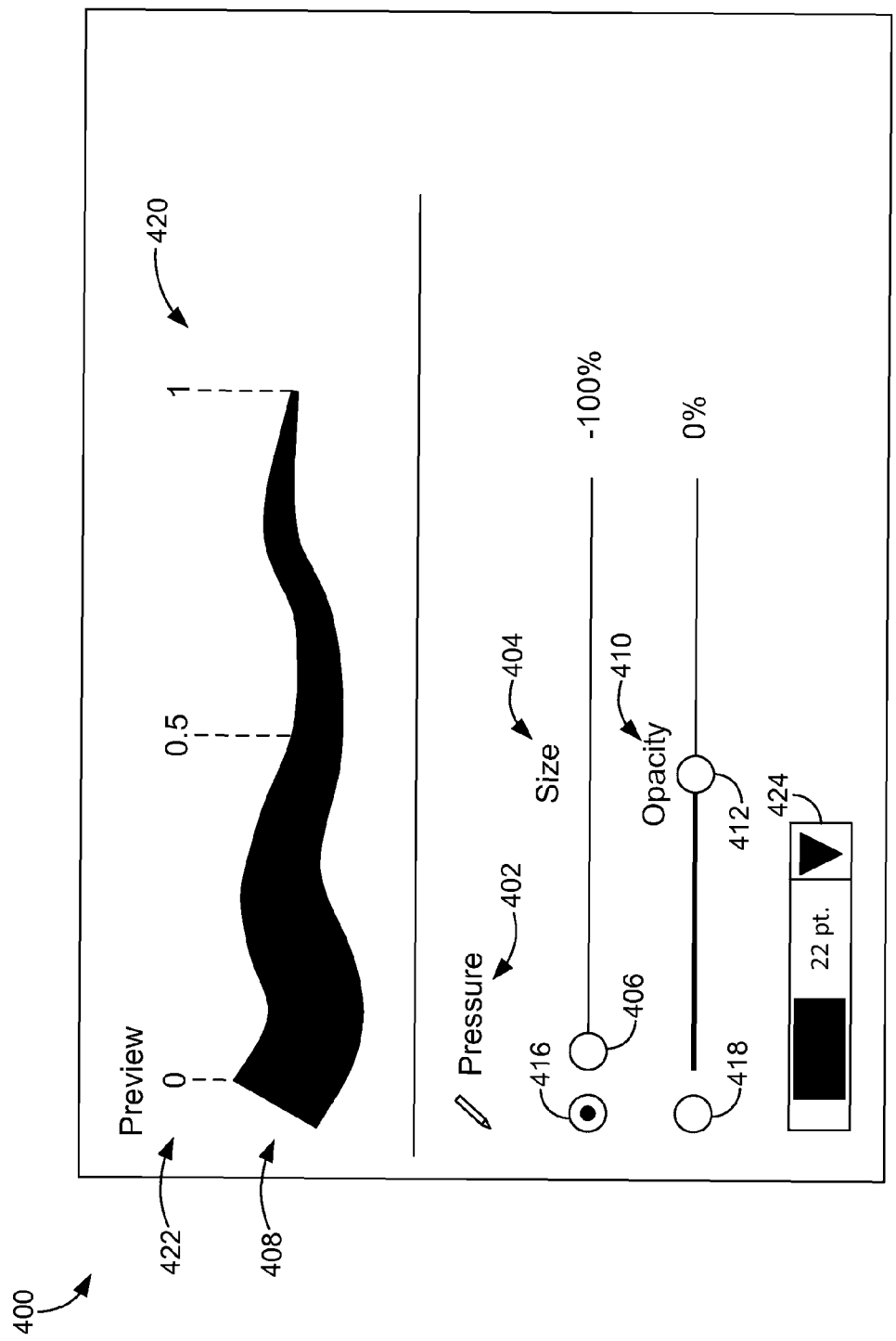
Figure 5:
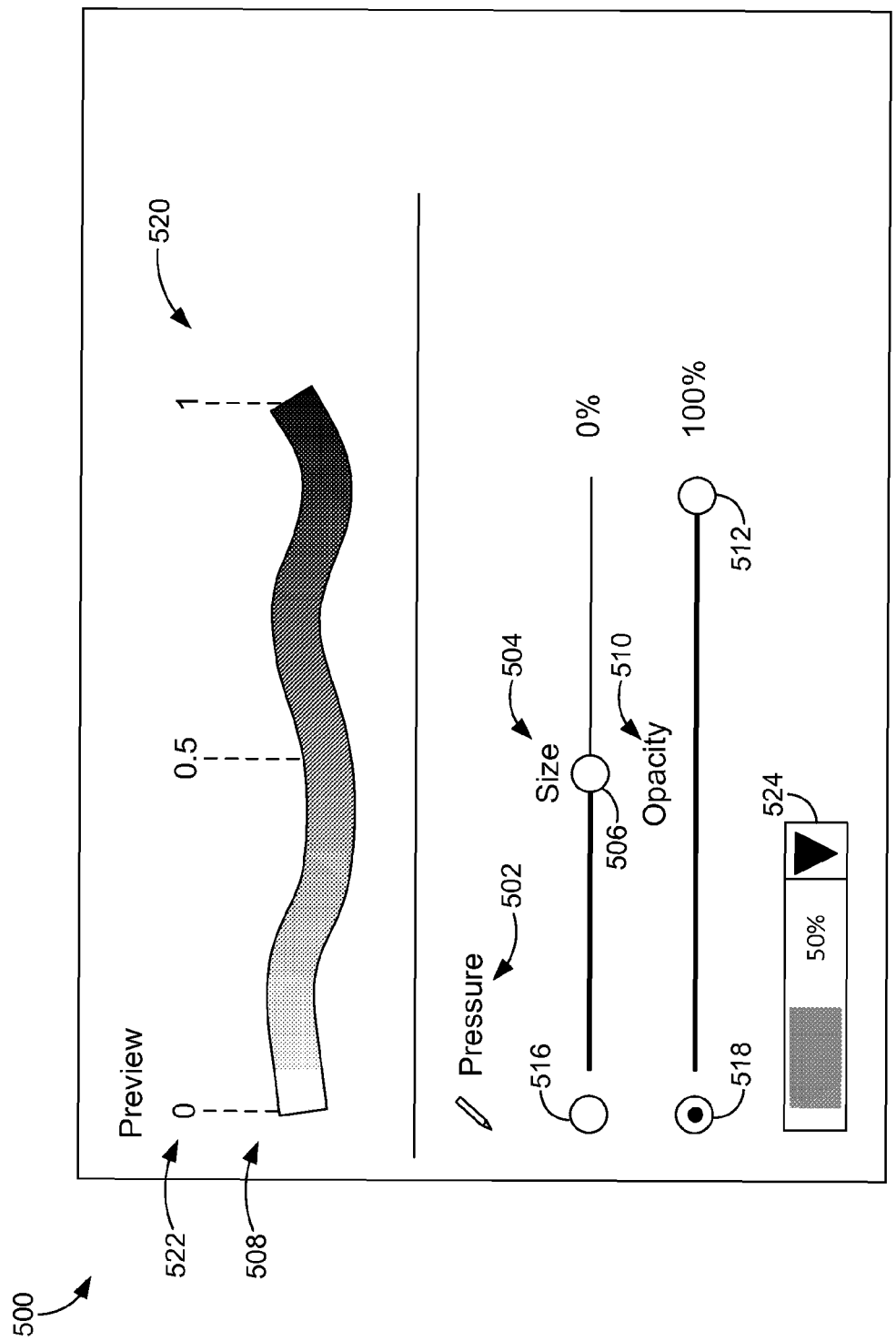
FIG. 5 depicts an illustrative user interface for controlling effect of pressure on the flow, or opacity, of a rendered stroke.

FIGS. 2-4 depict illustrative user interfaces for controlling effect of pressure on the thickness of a rendered stroke. FIG. 2 depicts an illustrative user interface 200. User interface 200 depicts a pressure menu 202 in which a user may select, via radio buttons 216 or 218, whether pressure affects a size attribute or an opacity attribute of the rendered stroke. The pressure-sensitive stroke attribute discussed herein is the attribute selected in pressure menu 202. Adjacent to each of radio buttons 216 and 218 are respective sliders 206 and 212. Sliders 206 and 212 enable a user of user interface 200 to select a single value that determines both a top and bottom of a range of possible attribute values based upon selected default attribute value 224. User interface 200 also includes a preview area 220 where the user can preview the rendered stroke 208 over the range of possible pressure levels 222 that results from the user's selections in the pressure menu. As depicted by radio button 216, the pressure sensitive stroke attribute depicted in FIG. 2 is size, also referred to herein as width or thickness, of the rendered stroke. As depicted, the selected default attribute value 224 coincides with a predefined pressure level of 0.5. Thus, a user that exerts a pressure level of 0.5 would cause a line to be rendered at the selected default attribute value, while application of a pressure level above or below the predefined pressure level of 0.5 would cause the size of the rendered stroke to decrease or increase, respectively. As depicted, the top of the range is the default attribute value 224 plus the percentage selected by slider 206, and the bottom of the range is the default attribute value 224 minus the percentage selected by slider 206. As can be seen, the user has selected 100%, which, in this embodiment has resulted in a stroke size that progressively increases from 0% to 200% of the default attribute value as the pressure level progressively increases from 0 to 1.

FIG. 3 depicts an illustrative user interface 300 that is similar to user interface 200 of FIG. 2. As with user interface 200 of FIG. 2, user interface 300 depicts a pressure menu 302 in which a user may select, via radio buttons 316 or 318, whether pressure affects a size attribute or an opacity attribute of the rendered stroke. The pressure-sensitive stroke attribute discussed herein would, again, be the attribute selected in pressure menu 302. Adjacent to each of radio buttons 316 and 318 are respective sliders 306 and 312. Sliders 306 and 312 enable a user of user interface 300 to select a single value that determines both a top and bottom of a range of possible attribute values based on selected default attribute value 324. User interface 300 also includes a preview area 320 where the user can preview the rendered stroke 308 over the range of possible pressure levels 322 that results from the user's selections in the pressure menu. As depicted by radio button 316, the pressure sensitive stroke attribute depicted in FIG. 3 is size, also referred to herein as width or thickness, of the rendered stroke. Again, as depicted, the top of the range is the default attribute value 324 plus the percentage selected by slider 306, and the bottom of the range is the default attribute value 324 minus the percentage selected by slider 306. As can be seen, the user has selected 0%, which, in this embodiment has resulted in a stroke size that is static at 100% of the default attribute value regardless of the pressure level applied.

FIG. 4 depicts an illustrative user interface 400 that is similar to user interfaces 200 and 300 of FIGS. 2 and 3, respectively. As with the previously discussed user interfaces, user interface 400 depicts a pressure menu 402 in which a user may select, via radio buttons 416 or 418, whether pressure affects a size attribute or an opacity attribute of the rendered stroke. The pressure-sensitive stroke attribute discussed herein would, again, be the attribute selected in pressure menu 402. Adjacent to each of radio buttons 416 and 418 are respective sliders 406 and 412. Sliders 406 and 412 enable a user of user interface 400 to select a single value that determines both a top and bottom of a range of possible attribute values based on selected default attribute value 424. User interface 400 also includes a preview area 420 where the user can preview the rendered stroke 408 over the range of possible pressure levels 422 that results from the user's selections in the pressure menu. As depicted by radio button 416, the pressure sensitive stroke attribute depicted in FIG. 4 is size, also referred to herein as width, of the rendered stroke. Again, as depicted, the default attribute value 424 coincides with a predefined pressure level of 0.5. Thus, a user that exerts a pressure level of 0.5 would cause a line to be rendered at the default attribute value 424, while application of a pressure level above or below the predefined pressure level of 0.5 would cause the size of the rendered stroke to decrease or increase, respectively. Again, as depicted, the top of the range is the default attribute value 424 plus the percentage selected by slider 406, and the bottom of the range is the default attribute value 424 minus the percentage selected by slider 406. As can be seen, the user has selected −100%, which, in this embodiment has resulted in a stroke size that progressively decreases from 200% to 0% of the default attribute value as the pressure level progressively increases from 0 to 1.

FIG. 5 depicts an illustrative user interface 500 for controlling effect of pressure on the opacity, or flow, of a rendered stroke. User interface 500 is similar to the previously discussed user interfaces. As with the previously discussed user interfaces, user interface 500 depicts a pressure menu 502 in which a user may select, via radio buttons 516 or 518, whether pressure affects a size attribute or an opacity attribute of the rendered stroke. The pressure-sensitive stroke attribute discussed herein would, again, be the attribute selected in pressure menu 502. Adjacent to each of radio buttons 516 and 518 are respective sliders 506 and 512. Sliders 506 and 512 enable a user of user interface 500 to select a single value that determines both a top and bottom of a range of possible attribute values based on selected default attribute value 524. User interface 500 also includes a preview area 520 where the user can preview the rendered stroke 508 over the range of possible pressure levels 522 that results from the user's selections in the pressure menu. As depicted by radio button 516, the pressure sensitive stroke attribute depicted in FIG. 5 is opacity, also referred to as flow, of the rendered stroke. Again, as depicted, the default attribute value coincides with a predefined pressure level of 0.5. Thus, a user that exerts a pressure level of 0.5 would cause a line to be rendered at the default attribute value 524, while application of a pressure level above or below the predefined pressure level of 0.5 would cause the opacity of the rendered stroke to increase or decrease, respectively. As depicted, the top of the range is the default attribute value 524 plus the percentage selected by slider 512, and the bottom of the range is the default value minus the percentage selected by slider 512. As can be seen, the user has selected 100%, which, in this embodiment has resulted in an opacity that progressively increases from 0% to 200% of the default attribute value as the pressure level progressively increases from 0 to 1.

It will be appreciated, that the user interfaces depicted in FIGS. 2-5 are merely meant to be illustrative of possible user interfaces. Furthermore, the pressure-sensitive stroke attributes depicted are also meant to be illustrative of possible pressure-sensitive stroke attributes. Any attribute that affects the appearance of a rendered stroke is contemplated herein as being a pressure-sensitive stroke attribute.

Figure 6:
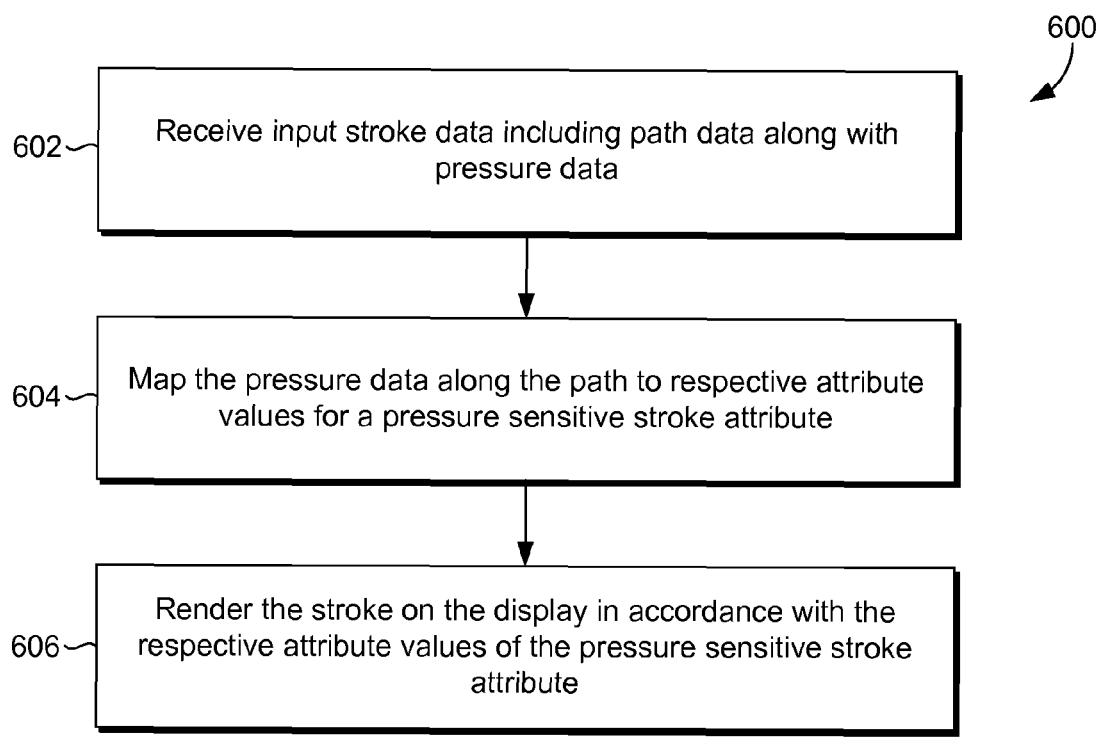
FIG. 6 is a flow diagram showing a method for facilitating pressure-sensitive stroke attributes according to various embodiments of the present disclosure.

FIG. 6 is an illustrative process flow 600 showing a method for facilitating pressure-sensitive stroke attributes according to various embodiments of the present disclosure. Such a method may be performed by, for example, the stroke rendering module discussed herein executing on a computing device. The process flow begins at block 602, where input stroke data is received. In embodiments, the input stroke data includes both path data defining a path of the stroke to be rendered and pressure data defining a plurality of pressure measurements taken along the path of the stroke. As discussed above in reference to FIG. 1, the path data may be generated and received from a touch-sensitive display or drawing tablet, for example. Also as discussed in reference to FIG. 1, the plurality of pressure measurements may be generated by a pressure sensitive stylus, a pressure-sensitive display, or a pressure sensitive drawing tablet, for example.

At block 604, the pressure data is mapped to attribute values along the path. This may be accomplished by mapping each pressure measurement of the pressure data to a range of possible attribute values for a pressure sensitive stroke attribute. This mapping would determine a plurality of attribute values for the pressure sensitive stroke attribute along the path. In embodiments, the mapping would result in a predefined level of pressure mapping to a default attribute value. In embodiments, the predefined level of pressure may, for example, be a midpoint of a range of possible pressure levels. A pressure level above or below the predefined level of pressure would then map to either a larger attribute value or a smaller attribute value than the default attribute value. In embodiments, the attribute values may lay within a user defined range of possible attribute values. Furthermore, a top and a bottom of the range of possible attribute values may be based on the default attribute value. Such a pressure mapping may be accomplished utilizing the function described in reference to FIG. 1, above.

Finally, at block 606, the stroke is rendered on a display of the computing device in accordance with the attribute values of the pressure sensitive stroke attribute. Such a rendering may be caused, for example, by the stroke rendering module discussed herein.

Figure 7:
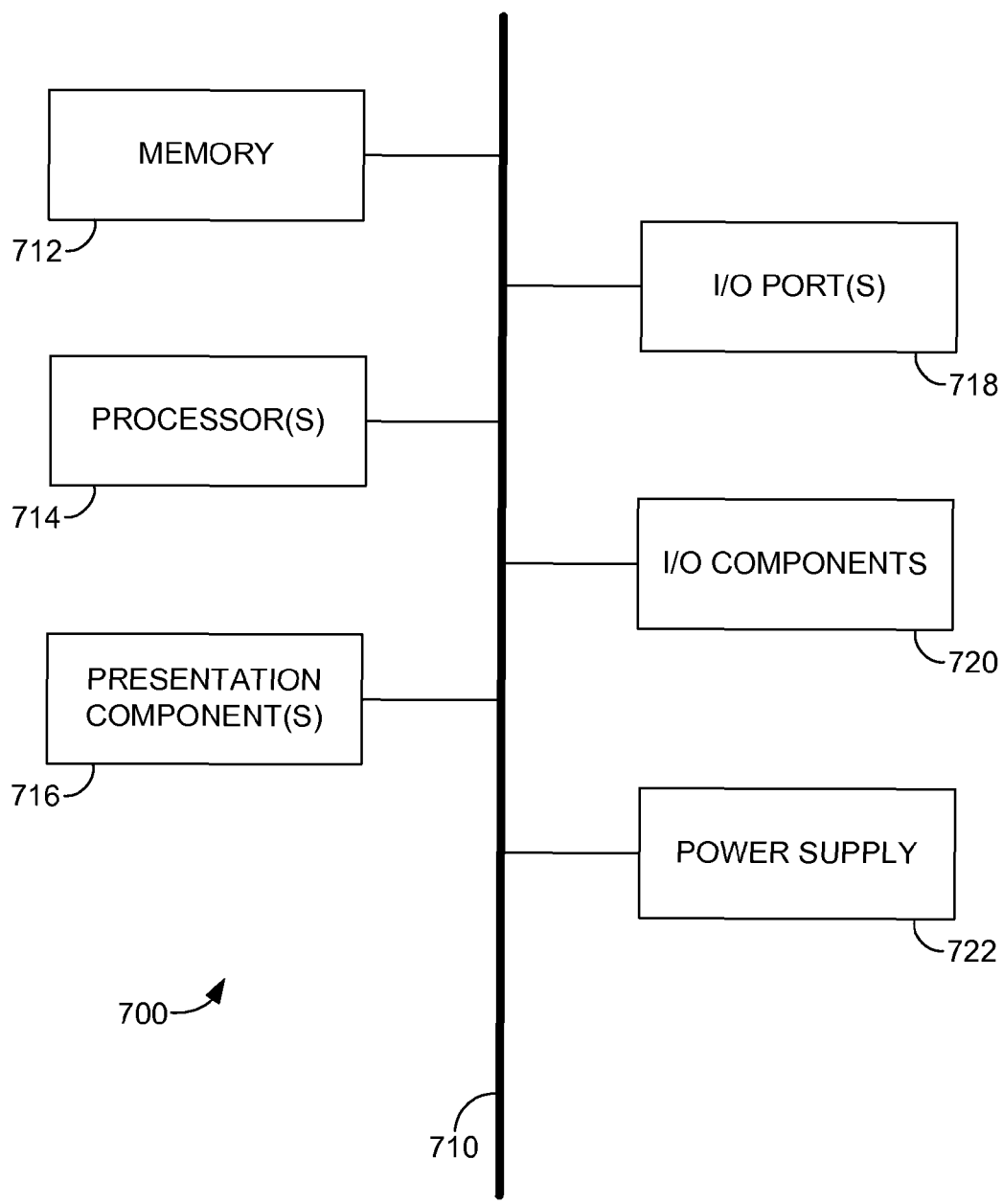
FIG. 7 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 716 while also being one of the I/O components 720. As another example, processors have memory integrated therewith in the form of cache; however, there is no overlap between the one or more processors 714 and the memory 712. A person having of skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 714 that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a stylus, such as that discussed elsewhere herein, a drawing tablet, such as that discussed elsewhere herein, a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to one or software modules or applications that may cause the display of the computing device 700 to render immersive augmented reality or virtual reality.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable storage media having executable instructions stored thereon, which, in response to execution by a processor of a computing device, provide the computing device with a drawing application that implements pressure sensitive stroke attributes to:
   determine a range of possible attribute values, based on a default attribute value and a sensitivity value, for a pressure sensitive stroke attribute, wherein the default attribute value is less than a maximum attribute value of the range of possible attribute values and greater than a minimum attribute value of the range of attribute values;
   receive input stroke data that includes path data defining a path of a stroke on a display of the computing device and a plurality of pressure measurements along the path, wherein the plurality of pressure measurements includes at least a first pressure measurement that is associated with a predefined level of pressure and a second pressure measurement;
   generate a map, based on the default attribute value and the sensitivity value, between the plurality of pressure measurements and a plurality of attribute values such that the plurality of attribute values includes at least:
   a first attribute value that is mapped to the first pressure measurement and corresponds to the default attribute value, and
   a second attribute value that is mapped to the second pressure measurement and based on the range of possible attribute values and a difference between the second pressure measurement and the predefined level of pressure; and
   render the stroke on the display based on the pressure sensitive stroke attribute, the stroke data, and the map.

2. The one or more computer-readable storage media of claim 1, wherein the predefined level of pressure is a midpoint of a range of possible pressure levels.

3. The one or more computer-readable storage media of claim 1, wherein the default attribute value is a midpoint of the range of possible attribute values for the pressure sensitive stroke attribute.

4. The one or more computer-readable storage media of claim 1, wherein the executable instructions, in response to execution by the processor of the computing device, further provide the computing device with a user interface that enables a user of the computing device to select the sensitivity value and each of the maximum attribute value and the minimum attribute value of the range of possible attribute values is based on the selected sensitivity value and the default value attribute.

5. The one or more computer-readable storage media of claim 1, wherein the sensitivity value is a positive value such that
   when the second pressure measurement is greater than the predefined level of pressure, the second attribute value is greater than the default attribute value, and
   when a third pressure measurement, included in the plurality of pressure measurements, is less than the predefined level of pressure, a third attribute value, included in the plurality of attribute values, is mapped to the third pressure measurement and is less than the default attribute value.

6. The one or more computer-readable storage media of claim 1, wherein the sensitivity value is a negative value such that
   when the second pressure measurement is greater than the predefined level of pressure, the second attribute value is less than the default attribute value, and
   when a third pressure measurement, included in the plurality of pressure measurements, is less than the predefined level of pressure, a third attribute value, included in the plurality of attribute values, is mapped to the third pressure measurement and is greater than the default attribute value.

7. The one or more computer-readable storage media of claim 1, wherein a difference between the second attribute value and the default attribute value is based on at least the difference between the second pressure measurement and the predefined level of pressure.

8. The one or more computer-readable media of claim 1, wherein each of the default attribute value and the sensitivity value is a user defined value.

9. The one or more computer-readable media of claim 1, wherein the pressure sensitive stroke attribute is one of width, opacity, or texture of the stroke.

10. The one or more computer-readable media of claim 1, wherein the pressure measurements are generated in response to a user employing at least one of a pressure sensitive stylus or a pressure sensitive touch screen.

11. A computer-implemented method for implementing pressure sensitive stroke attributes comprising:
   determine a range of possible attribute values, based on a default attribute value and a sensitivity value, for a pressure sensitive stroke attribute, wherein the default attribute value is less than a maximum attribute value of the range of possible attribute values and greater than a minimum attribute value of the range of attribute values;

receiving, by a computing device, input stroke data that includes path data defining a path of a stroke on a display of the computing device and a plurality of pressure measurements along the path that includes at least a first pressure measurement that is associated with a predefined level of pressure and a second pressure measurement;

generate a map, based on the default attribute value and the sensitivity value, between the plurality of pressure measurements and a plurality of attribute values, such that the plurality of attribute values includes at least:

a first attribute value that is mapped to the first pressure measurement and corresponds to the default attribute value, and a second attribute value that is mapped to the second pressure measurement a second attribute value and based on the range of possible attribute values and a difference between the second pressure measurement and the predefined level of pressure; and rendering the stroke on the display based on the pressure sensitive stroke attribute, the stroke data, and the map.

12. The computer-implemented method of claim 11, wherein the predefined level of pressure is a midpoint of a range of possible pressure levels, and wherein each of the sensitivity value and the default attribute value is a user defined value.

13. The computer-implemented method of claim 11, further comprising providing a user interface to enable a user of the computing device to select the sensitivity value and each of the maximum attribute value and the minimum attribute value of the range of possible attribute values are based on the selected sensitivity value and the default attribute value.

14. The computer-implemented method of claim 11, wherein when the sensitivity value is greater than a threshold value and the second pressure measurement is greater than the predefined level of pressure, the second attribute value is greater than the default attribute value, while a third pressure measurement, included in the plurality of pressure measurements, is less than the predefined level of pressure is mapped to a third attribute value, included in the plurality of attribute values, is less than the default attribute value; and when the sensitivity value is less than the threshold value and the second pressure measurement is greater than the predefined level of pressure, the second attribute value is less than the default attribute value, while the third pressure measurement is less than the predefined level of pressure is mapped to the third attribute value that is greater than the default attribute value.

15. The computer-implemented method of claim 11, wherein a difference between the second attribute value and the default attribute value is based on at least the difference between the second pressure measurement and the predefined level of pressure.

16. The computer-implemented method of claim 11, wherein the pressure sensitive attribute is one of width, opacity, or texture of the stroke.

17. A computing device for implementing pressure sensitive stroke attributes comprising:

a display; and a drawing application to:

determine a range of possible attribute values, based on a default attribute value and a sensitivity value, for a pressure sensitive stroke attribute, wherein the default attribute value is less than a maximum attribute value of the range of possible attribute values and greater than a minimum attribute value of the range of attribute value;

receive input stroke data that includes path data defining a path of a stroke on the display and a plurality of pressure measurements along the path, wherein the plurality of pressure measurements includes at least a first pressure measurement that is associated with a predefined level of pressure and a second pressure measurement;

determine a plurality of attribute values that includes at least a first attribute value that corresponds to the default attribute value and a second attribute, wherein the first attribute value is mapped to the first pressure measurement, and the second attribute value is mapped to the second pressure measurement and is based on the range of possible attribute values and a difference between the second pressure measurement and the predefined level of pressure; and render the stroke on the display based on the pressure sensitive stroke attribute and at least a portion of the plurality of attribute values.

18. The computing device of claim 17, wherein the predefined level of pressure is a midpoint of a range of possible pressure levels, and wherein each of the default attribute value and the sensitivity value is a user defined value.

19. The computing device of claim 17, wherein the display is a touch sensitive display that generates at least one of the path data or the plurality of pressure measurements.

20. The computing device of claim 17, wherein a stylus generates at least one of the path data or the plurality of pressure measurements.

* * * * *